United States Patent [19]
Maligie

[11] Patent Number: 5,601,770
[45] Date of Patent: Feb. 11, 1997

[54] METHOD FOR PRODUCING SHEET MOLDING COMPOUNDS UTILIZING A MULTILAYERED, MULTISTRUCTURED, MULTIPOLYMER RELEASE / BARRIER FILM

[75] Inventor: John D. Maligie, Carson, Calif.

[73] Assignee: Airtech International, Inc., Carson, Calif.

[21] Appl. No.: 536,684

[22] Filed: Sep. 29, 1995

[51] Int. Cl.$^6$ ............ B29C 39/20; B29C 43/30; B32B 27/08; B32B 27/34

[52] U.S. Cl. ............ 264/172.19; 264/119; 264/130; 264/258; 264/338; 428/220; 428/474.4

[58] Field of Search .................. 264/172.19, 113, 264/119, 130, 135, 136, 175, 257, 258, 338; 428/220, 474.4

[56] References Cited

U.S. PATENT DOCUMENTS

| | | | |
|---|---|---|---|
| 3,895,988 | 7/1975 | Miller | 156/276 |
| 4,474,845 | 10/1984 | Hagerman | 264/257 |
| 4,568,505 | 2/1986 | Bollen | 264/119 |
| 4,959,189 | 9/1990 | Rohrbacher | 264/135 |
| 5,126,085 | 6/1992 | Thorp | 264/135 |

*Primary Examiner*—Daniel Stemmer
*Attorney, Agent, or Firm*—Jeffrey A. Hall

[57] ABSTRACT

A method for producing SMC where a multilayered, multistructured, multipolymer release/barrier film is used as a polymeric film. The multilayered, multistructured, multipolymer release/barrier film is preferably produced by multilayered cast extrusion process. The tensile strength of the multilayered, multistructured, multipolymer release/barrier film should not be less than 8000 psi when tested to ASTM D882. Preferably, the film should inhibit styrene transmission at a rate no less than $2.0 \times 10^{-11}$ g. cm/cm$^2$-hr. as tested per ASTM F739-81 and a surface tension level not to exceed 30 dynes/cm when tested in accordance with ASTM D2578.

14 Claims, 2 Drawing Sheets

METHOD FOR PRODUCING SHEET MOLDING COMPOUNDS UTILIZING A MULTILAYERED, MULTISTRUCTURED, MULTIPOLYMER RELEASE / BARRIER FILM

BACKGROUND OF THE INVENTION

1. Field of Invention

This invention relates to methods for producing sheet molding compounds, and more particularly to methods for producing sheet molding compounds utilizing a multilayered, multistructured, multipolymer release/barrier film.

2. Description of the Related Art

A significant amount of research and development efforts in the technology of reinforcing plastics and thermoplastics has been made. Encouraged by the need of the aerospace and automobile industry to produce lighter weight and more energy efficient vehicles, planes and associated apparatus, a great deal of the activity in this field has been devoted to developing plastics strong enough and with sufficient durability to replace many of the metal structural support members in such vehicles. Reinforced plastic parts must possess similar structural strength and integrity as a metal component while reducing its weight. Because of this demand, a significant research and development effort directed at developing high strength structural composites has been focused on the development of sheet molding compounds (SMC), which thereby allow rapid matched-die molding methods.

Typically SMC are comprised of an unsaturated polyester, a crosslinkable polymeric resin, chopped fiber reinforcement, and other additives of lesser importance. Such composite material is generally prepared by depositing the chopped fiber on a layer of fluid resin supported on a moving polyamide/polyolefin film. This matrix is generally sandwiched by an additional layer of film composed of a blended polyamide/polyolefin film of low crystallinity, similar to that disclosed in U.S. Pat. No. 4,444,829 issued Apr. 24, 1984. Alternatively, a common practice is to use a polyolefin film where the polyamide/polyolefin does not provide sufficient release from particular SMC compounds.

Usually such composites are passed through a series of kneading and compaction rolls and then typically rolled into large rolls. Such rolls are then wrapped in aluminum foil to prevent loss of monomers such as styrene. Following a maturation period, usually about 2–5 days during which the polyester partially cures and increases in viscosity to a suitable consistency, the SMC is then used to produce molded parts for airplanes, boats, automobiles, and the like, by cutting a piece of SMC from the roll, peeling away the carrier film, and then placing the SMC in a heated mold for molding and complete curing.

However, there are significant limitations associated with all such prior SMC producing methods and apparatuses. Due to the limited amount of polyolefin and the conventional blending of the polyolefin with a polyamide to produce a polyamide/polyolefin alloy, such as the disclosed in U.S. Pat. No. 4,444,829 and U.S. Pat. No. 4,568,505 issued Feb. 4, 1989, significant shortcomings result. The primary limitations of such prior methods is the polyamide/polyolefin does not release from many SMC compounds therefore making it necessary to use a straight polyolefin film for many applications as well as allowing significant amounts of monomers such as styrene to escape into the atmosphere. Furthermore, when a straight polyolefin film is utilized during production of SMC compounds, release is no longer a problem, however during the ensuing storage period, even more significant amounts of monomers such as styrene escape than with a polyamide/polyolefin alloy, which in either case is significant because styrene acts as a cross-linking agent for the resin and styrene is considered an environmental hazard.

Another significant limitation of prior methods is that a straight polyolefin film has far less tensile strength that a multilayered, multistructured, multipolymer release/barrier film which increases the chance of carrier film breakage. This results in more interruptions and down time in the production process and requires SMC producers to carry multiple inventories. In addition to a straight polyolefin having extremely limited resistance to styrene monomer, a film composed of a polyamide/polyolefin mix, such as that described in the aforementioned U.S. Pat. No. 4,444,829, allows far more styrene permeation than desired by SMC producers as well as the previously mentioned loss of styrene monomer through the polyolefin sections of the polyamide/polyolefin film resulting in poor product flow and unacceptable molded parts. Secondary problems associated with such prior films is the odor from the released styrene and the concomitant health and environmental hazards associated with such release. Moreover, if the ratio of polyamide to polyolefin is decreased to improve release, the resultant film allows even more styrene passage and has less tear strength, resulting in more down time and financial loss for the SMC producer.

Therefore, there is a clear need for a film capable of releasing from all SMC compounds that does not allow significant styrene monomer transmission while at the same is of high strength so as to eliminate down time and production losses associated with all prior SMC films.

Accordingly, it is the primary object of this invention to provide a method for the production of an SMC utilizing a film which is capable of releasing from all SMC compounds, does not allow significant styrene monomer transmission, and which is of very high strength. The foregoing is achieved utilizing a multilayered, multistructured, multipolymer release/barrier film either monoaxially oriented or bi-axially oriented to coat or sandwich an SMC. This allows for excellent release characteristics from all SMC compounds, eliminates down time and loss due to tearing, and can be specifically designed to meet particular SMC formula requirements thereby providing an SMC producer flexibility in controlling the styrene content of its compounds depending upon their final application, without sacrificing release characteristics or strength.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, a method for producing sheet molding compounds is described herein utilizing a multilayered, multistructured, multipolymer release/barrier film which may be either mono-axially oriented or bi-axially oriented providing the characteristics of excellent release from all SMC compounds, eliminating down time in the production of SMC compounds, and allowing for control of styrene release, and which is very strong and versatile.

In a preferred embodiment the multilayered, multistructured, multipolymer release/barrier film is produced by multilayered cast or blown extrusion process. The tensile strength of a multilayered, multistructured, multipolymer release/barrier film should not be less than 8000 psi when tested to ASTM D882. Preferably, the film should inhibit styrene transmission at a rate no less than $2.0 \times 10^{-11}$ g. cm/cm$^2$-hr. as tested per ASTM F739-81 and a surface dyne level not to exceed 30 dynes/cm when tested in accordance with ASTM D2578.

In accordance with the purpose of the invention, a method for producing sheet molding compounds utilizing a multilayered, multistructured, multipolymer release/barrier film is provided, where an improved method for producing sheet molding compounds of the type including the steps of casting a layer of heat-curable thermosetting resin, in a fluid form, onto a continuously advancing polymeric film; introducing reinforcing material onto the advancing fluid layer, casting a secondary layer of heat-curable thermosetting resin in a fluid form on top of the reinforcing fibers, contacting a polymeric film to the top surface of said reinforced fluid layer thereby forming a sandwiched composite; advancing said sandwiched composite through a series of kneading and compaction rolls, and winding the sandwiched composite into a roll for partial curing; the improvement comprising: using as the polymeric film a multilayered, multistructured, multipolymer release/barrier film, said multilayered, multistructured, multipolymer release/barrier film having a surface tension of less than 30 dynes/cm as tested per ASTM D2578, a tensile strength greater than 8000 psi as determined by ASTM D882, and a styrene permeability of below about $2.0 \times 10^{-11}$ g. cm/cm$^2$-hr.

The method of the present invention also provides an SMC sandwich composite produced by the above described process.

In accordance with the present invention, there also is provided an improved method for producing sheet molding compounds comprising: (i) casting a layer of heat-curable thermosetting resin in a fluid form, onto a continuously advancing polymeric film; (ii) introducing reinforcing material onto the advancing fluid layer; (iii) casting a secondary layer of heat-curable thermosetting resin, in a fluid form, on top of the reinforcing fibers; (iv) contacting a polymeric film to the top surface of said reinforced fluid layer thereby forming a sandwiched composite; (v) advancing said sandwiched composite through a series of kneading and compaction rolls; and (vi) winding the sandwiched composite into a roll for partial curing; the improvement which comprises using as the polymeric film a multilayered, multistructured, multipolymer release/barrier film having a surface tension of less than 30 dynes/cm, a tensile strength greater than 8000 psi as determined by ASTM D882, and a styrene permeability of below about $2.0 \times 10^{-11}$ g. cm/cm$^2$-hr.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings. Multilayered, multistructured, multipolymer release/barrier films suitable for use in producing the subject film include multilayered, multistructured, multipolymer release/barrier films having a surface tension of less than 30 dynes/cm, a tensile strength greater than 8000 psi as determined by ASTM D882, and a styrene permeability of below about $2.0 \times 10^{-11}$ g. cm/cm$^2$-hr.

In accordance with the present invention, there is provided an improved method for producing sheet molding compounds of the type including the steps of casting a layer of heat-curable thermosetting resin, in a fluid form, onto a continuously advancing polymeric film; introducing reinforcing material onto the advancing fluid layer; contacting a polymeric film to the top surface of said reinforced fluid layer thereby forming a sandwiched composite; advancing said sandwiched composite through a series of kneading and compaction rolls, and winding the sandwiched composite into a roll for partial curing; the improvement comprising: using as the polymeric film a multilayered, multistructured, multipolymer release/barrier film, said multilayered, multistructured, multipolymer release/barrier film having a surface tension of less than 30 dynes/cm, a tensile strength greater than 8,000 psi as determined by ASTM D882, and a styrene permeability of below about $2.0 \times 10^{-11}$ g. cm/cm$^2$-hr.

Figure 1:
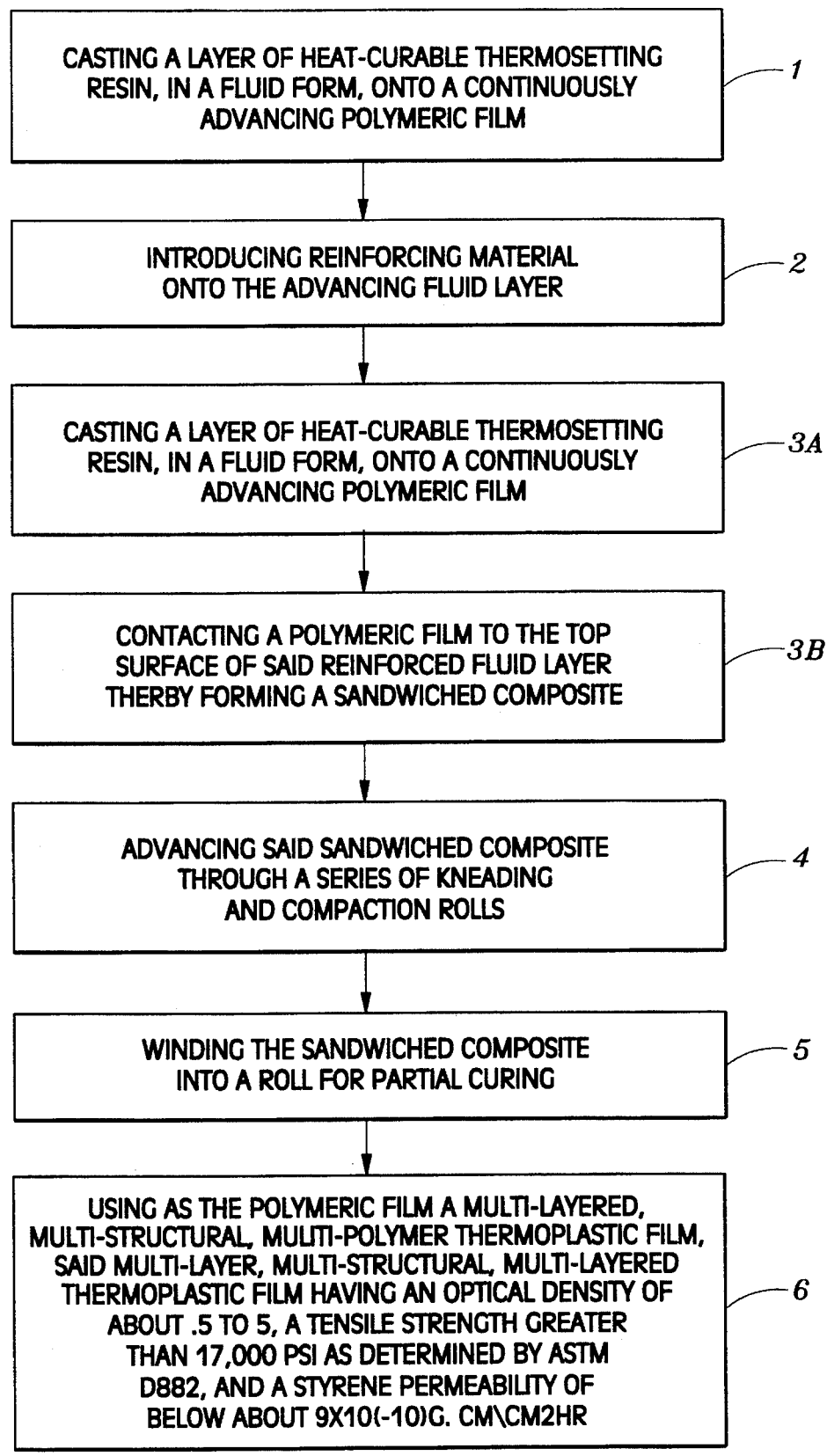
FIG. 1 is a flow chart illustrating the preferred steps of the method of present invention.

In FIG. 1, a flow chart illustrating the preferred steps of the present invention shows step 1 of casting a layer of heat-curable thermosetting resin, in a fluid form, onto a continuously advancing polymeric film. In step 2, reinforcing material is introduced onto the advancing composite, and in step 3A, an additional layer of heat-curable thermosetting resin is added in a fluid form, followed by 3B, the addition of a polymeric film contacting the top surface of said reinforced composite thereby forming a sandwiched composite. In step 4, the sandwiched composite is advanced through a series of kneading and compaction rolls. In step 5, the sandwiched composite is wound into a roll for partial curing. Step 6 shows using as the polymeric film a multilayered, multistructured, multipolymer release/barrier film. The multilayered, multistructured, multipolymer release/barrier film preferably having a surface tension of less than 30 dynes/cm, a tensile strength greater than 8000 psi as determined by ASTM D882, and a styrene permeability of below about $2.0 \times 10^{-11}$ g. cm/cm$^2$-hr.

As used herein, by the term olefin component is meant completely or substantially linear high molecular weight polymers of alpha-olefins, for example polyethylene, polypropylene or polyisobutylene, and copolymers of alpha-olefins with vinyl-acetate monomers, or alkyl acrylates such as ethylene methylacrylate or ethylene/ethylacrylate copolymers. Such polyolefins can be obtained by any of the usual process, for example, by high pressure polymerization, low pressure polymerization, bulk, suspension, or emulsion polymerization. The polyolefin component is preferably of low crystallinity with a molecular weight of about 1000 to 1,000,000, with from 10,000 to 50,000 being preferred. A preferred polyolefin component in the subject thermoplastic film is low and linear low density polyethylene.

The thermoplastic film of the present invention can be prepared by using a conventional olefin component such as non, mono, or biaxially oriented thermoplastic films composed of simple olefins such as ethylene, propylene, butenes, isoprenes, pentenes, or the like. Alternatively, copolymers or modifications thereof may be used as well as polyester or polyamides. Preferably the thermoplastic film is processed, however, this is not required, by blown film extrusion, cast film extrusion, or calendering. An inherent characteristic common to polyolefin films produced by the aforementioned methods is a non-polar, non-porous inert surface which is not non-receptive to adhesive, SMC compounds, inks, lacquers, and the like, without special treatments.

According to the invention, the multilayered, multistructured, multipolymer release/barrier film is then preferably produced by multilayered cast film extrusion producing an unsupported film by casting a fluid resin or plastic compound on a temporary carrier, usually an endless belt or more commonly a circular drum (casting roll) followed by solidification and removal of the film from the carrier. The polymers may be in a solution, dispersion or as a fluidized polymeric resin.

A preferred structure would consist of 5 layers described from top to bottom as:

1. Low density polyethylene 22%
2. Tie layer 8%
3. Polyamide (polycaprolactam) 40%
4. Tie layer 8%
5. Low density polyethylene 22%

An alternative method utilizes a blown film system which produces film via an extruded plastic tube usually but not always extended in the vertical position out of a circular die, continuously or intermittently inflated by internal air pressure, cooled, collapsed by rollers and wound on subsequent rolls. Preferably, the resultant thermoplastic film is a multilayered, multistructured, multipolymer release/barrier film with a surface tension level of 30 dynes/cm. The polyolefin components of the multilayered, multistructured, multipolymer release/barrier film function as release and yield increasing layers. The utilization of a multilayered, multistructured, multipolymer release/barrier film not only increases strength of the film but also decreases the amount of styrene permeating through the thermoplastic release film. Preferably, the inner layer(s) of the multilayered film should provide a stronger film. Further, the use of a multilayered, multistructured film aids in reducing the rate of transmission of styrene monomer to not more than $2.0 \times 10^{-11}$ g. cm/cm$^2$-hr.

Figure 2:
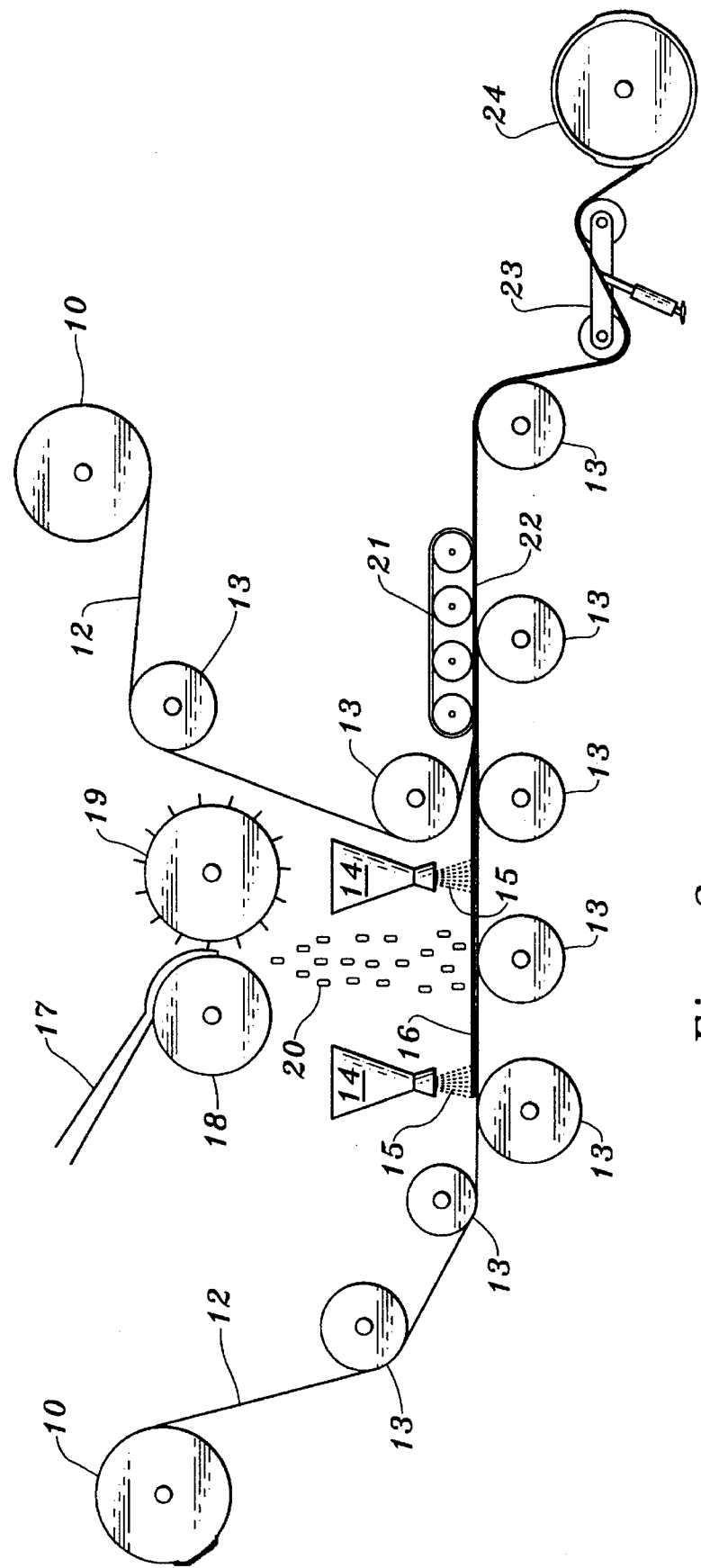
FIG. 2 shows a preferred embodiment for implementing the method of the present invention where film layers having SMC resin deposited thereon, chopped fiber being deposited thereon, and the sandwich composite being formed, compacted, and wound, utilizing a multilayered, multistructured, multipolymer release/barrier film, according to the invention.

As seen in FIG. 2, a general description of the method of the present invention as preferably implemented is shown using apparatus well known in the art. Storage rolls 10 release stored film 12 onto carrier/conveyor rolls 13 which transport the subject film 12 throughout the sandwich forming method. Dispenser 14 preferably deposits fluid SMC resin/filler paste 15 onto film 12 forming resin filler layer 16. Glass reinforcement is added to bottom layer 16 whereby continuous strand roving 17 is guided and advanced by roller 18 positioned in relation to cutter 19 such that the roving strand 17 is chopped into smaller size reinforcing pieces 20, of preferably about 1 inch in length which is then deposited onto layer 16 of the advancing coating film and advances whereby an additional layer of resin 15 is deposited and subsequently sandwiched by an additional layer of the subject film 12 which transports the composite sandwich under rollers 21 on conveyor 22. The layered film is collected on mandrel 24 to form a roll of SMC composite whose tension is controlled by a dancing load sensor 23.

The above described embodiment is the usual method of producing SMC sandwich composites, in which the barrier film has been performed in a separate step, stored, and is then removed and used in the process. An alternative method utilizes a film produced in two different film extrusion/casting operations and utilized directly to make SMC sandwich composite. In practice, the distance from lower roll 10 to the mandrel 24 is a significant length, typically up to about 30 feet or more. The exact size being determined by plant size and other operating factors well known in the art.

The novelty of the subject method is the use of a multilayered, multistructured, multipolymer release/barrier film as a carrier-liner for producing SMC sandwiched composite, which possesses the desirable qualities needed for effective utilization of SMC on a commercial scale. The operating variables with respect to the type of apparatus, speed of the film, and temperature employed in the process are all well known in the art and need not be repeated here. A description of the general process using polyethylene as the filler carrier may be found in *Handbook Of Technology and Engineering or Reinforced Plastics/Composites*, pp. 207–237, Van Norstrand Reinhold, New York, 1973, herein incorporated by reference.

A typical SMC compound contains the following components: resin, formed from (1) unsaturated acids or acid anhydrides such as fumaric acid and/or maleic anhydride combined with (2) saturated acids or acid anhydrides such as phthalic anhydride and/or isophthalic acid or adipic acid reacted with (3) glycols or diglycols such as ethylene glycol, propylene glycol, diethylene glycol or dipropylene glycol; cross-linking monomer such as styrene or vinyl toluene; catalyst, peroxides or peracids such as t-butyl perbenzoate; catalyst activator, metallic soaps such as zinc stearate; mineral extenders or fillers such as calcium carbonate; pigment, for example iron oxide; and thickening agent, for example magnesium hydroxide. An example of amounts of these components is: resin and monomer 100 parts; catalyst 1 part; catalyst activator 3 parts; filler 150 parts; pigment 3 parts; and thickening agent 4 parts. To such resin mixture, chopped glass fiber, preferably of about 1 to 2 inches in size and/or other fibrous reinforcements may be added.

Accordingly, also a subject of this invention is an improved method for producing sheet molding compounds comprising: (i) casting a layer of heat-curable thermosetting resin, in a fluid form, onto a continuously advancing polymeric film; (ii) introducing reinforcing material onto the advancing fluid layer; (iii) casting a secondary layer of heat-curable thermosetting resin, in a fluid form, on top of the reinforcing fibers; (iv) contacting a polymeric film to the top surface of said reinforced fluid layer thereby forming a sandwiched composite: (v) advancing said sandwiched composite through a series of kneading and compaction rolls; and (vi) winding the sandwiched composite into a roll for partial curing; the improvement which comprises using as the polymeric film a multilayered, multistructured, multipolymer release/barrier film having a surface tension of less than 30 dynes/cm, a tensile strength greater than 8000 psi as determined by ASTM D882, and a styrene permeability of below about $2.0 \times 10^{-11}$ g. cm/cm$^2$-hr.

The following examples are illustrative of the best mode of carrying out the invention, however, they should not be construed as being limitations on the scope or spirit of the invention.

EXAMPLE 1

A standard SMC containing 100 parts Owens-Corning resin E-920-1 containing 40 parts styrene monomer; 150 parts calcium carbonate; 3 parts zinc stearate; 1 part tertiary-butyl benzoate; 3 parts iron oxide; and 3.8 parts magnesium hydroxide were combined with a multilayered, multistructured, multipolymer release/barrier film prepared for use as a sandwich composite with the SMC. The multilayered, multistructured, multipolymer release/barrier film was prepared using traditional methods (see for example, Example 1–7 U.S. Pat. No. 4,444,829 issued to Bollen et al. Apr. 24, 1984) except that instead of a polyamide film, the multilayered, multistructured, multipolymer release/barrier film as described herein was utilized. The multilayered, multistructured, multipolymer release/barrier film was prepared using monoaxially orientated cast film technology. From this cast technology a 5-layer multilayered, multistructured, multipolymer structure was created.

1. Low density polyethylene 22%
2. Tie layer 8%
3. Polyamide (polycaprolactam) 40%
4. Tie layer 8%
5. Low density polyethylene 22%

This structure has a surface tension of less than 30 dynes/cm and a tensile strength greater than 8000 psi as determined by ASTM D882. Styrene transmission was inhibited as measured per ASTM F739-81 at more than $2.0 \times 10^{-11}$ g. cm/cm$^2$-hr. After 5 weeks the SMC compound remained soft, pliable and processable.

EXAMPLE 2

An SMC compound was prepared as per Example 1 using traditional methods well known in the art except that the thermoplastic film was prepared using a 5-layer multilayered., multistructured, multipolymer structure and processed by internal bubble cooling blown film technology.

1. Low density polyethylene 32%
2. Tie layer 8%
3. Polyamide (polycaprolactam) 20%
4. Tie layer 8%
5. Low density polyethylene 32%

The film produced a surface tension of less than 30 dynes/cm. Styrene transmission was inhibited as measured per ASTM F739-81 at more than $2.0 \times 10^{-11}$ g. cm/cm$^2$-hr. and contained enough styrene monomer in a 5-week outline test as to be soft, pliable and processable. However, the tensile strength dropped to less than 8000 psi as determined by ASTM D882 which is too low, causing tears in production of SMC compounds.

EXAMPLE 3

A standard SMC containing 100 parts Owens-Corning rosin E-920-1 containing 40 parts styrene monomer; 150 parts calcium carbonate; 3 parts zinc stearate; 1 part tertiary-butyl benzoate; 3 parts iron oxide; and 3.8 parts magnesium hydroxide were combined with a multilayered, multistructured, multipolymer release/barrier film prepared for use as a sandwich composite with the SMC. The multilayered, multistructured, multipolymer release/barrier film was prepared using traditional methods (see for example, Example 1–7 U.S. Pat. No. 4,444,829 issued to Bollen et al. Apr. 24, 1984) except that instead of a polyamide film, the multilayered, multistructured, multipolymer release/barrier film as described herein was utilized. The multilayered, multistructured, multipolymer release/barrier film was prepared using monoaxially orientated cast film technology. From this cast technology a 5-layer structure was created.

1. Low density polyethylene 39.5%
2. Tie layer 8%
3. Polyamide (polycaprolactam) 5%
4. Tie layer 8%
5. Low density polyethylene 39.5%

This structure has a surface tension of less than 30 dynes/cm, and a tensile strength less than 5000 psi as determined by ASTM D882. Styrene transmission was inhibited as measured per ASTM F739-81 at more than $5.0 \times 10^{-11}$ g. cm/cm$^2$hr.

After 5 weeks the SMC compound showed signs of embrittlement, making it exhibit marginal processability.

EXAMPLE 4

A standard SMC containing 100 parts is Owens-Corning resin E-920-1 containing 40 parts styrene monomer; 150 parts calcium carbonate; 3 parts zinc stearate; 1 part tertiary-butyl benzoate; 3 parts iron oxide; and 3.8 parts magnesium hydroxide were combined with a multilayered, multistructured, multipolymer release/barrier film prepared for use as a sandwich composite with the SMC. The multilayered, multistructured, multipolymer release/barrier film was prepared using traditional methods (see for example, Example 1–7 U.S. Pat. No. 4,444,829 issued to Bollen et al. Apr. 24, 1984) except that instead of a polyamide film, the multilayered, multistructured, multipolymer release/barrier film as described herein was utilized. The multilayered, multistructured, multipolymer release/barrier film was prepared using monoaxially orientated cast film technology. From this cast technology a 3-layer structure was created.

1. Low density polyethylene 25%
2. Linear low density polyethylene 50%.
5. Low density polyethylene 25%

This structure has a surface tension of less than 30 dynes/cm and a tensile strength less than 5000 psi as determined by ASTM D882. Styrene transmission was inhibited as measured per ASTM F739-81 at less than $5.0 \times 10^{-9}$ g, cm/cm2-hr.

After 3 weeks the SMC compound was embrittled to the point of unprocessability.

EXAMPLE 5

A standard SMC containing 100 parts Owens-Corning resin E-920-1 containing 40 parts styrene monomer; 150 parts calcium carbonate; 3 parts zinc stearate; 1 part tertiary-butyl benzoate; 3 parts iron oxide; and 3.8 parts magnesium hydroxide were combined with a multilayered, multistructured, multipolymer release/barrier film prepared for use as a sandwich composite with the SMC. The multilayered, multistructured, multipolymer release/barrier film was prepared using traditional methods (see for example, Example 1–7 U.S. Pat. No. 4,444,829 issued to Bollen et al. Apr. 24, 1984) except that instead of a polyamide film, the multilayered, multistructured, multipolymer release/barrier film as described herein was utilized. The multilayered, multistructured, multipolymer release/barrier film was prepared using monoaxially orientated cast film technology. From this cast technology a 5-layer multilayered, multistructured, multipolymer structure was created.

1. Polycaprolactam (polyamide 6) 20%
2. Tie layer 8%
3. Linear low density polyethylene 15%
4. Tie layer 8%
5. Polycaprolactam (polyamide 6) 20%

This structure has a tensile strength greater than 8000 psi as determined by ASTM D882. Styrene transmission was inhibited as measured per ASTM F739-81 at greater than $2.0 \times 10^{-11}$ g. cm/cm$^2$-hr but yielded a surface tension of greater than 40 dynes/cm, which did not allow for removal of the SMC compound from the multilayer carrier sheet.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. An improved method for producing sheet molding compounds, said method including the steps of casting a layer of heat-curable thermosetting resin, in a fluid form, onto a continuously advancing polymeric film; introducing reinforcing material onto the advancing fluid layer; casting a second layer of heat-curable thermosetting resin, in a fluid form on top of the reinforcing fibers; contacting a polymeric film to the top surface of said reinforced fluid layer thereby forming a sandwiched composite; advancing said sandwiched composite through a series of kneading and compaction rolls, and winding the sandwiched composite into a roll for partial curing; the improvement comprising:

using as the polymeric film a multilayered, multipolymer release/barrier film, said multilayered film having a surface tension of less than 30 dynes/cm as tested per ASTM D2578, a tensile strength greater than 8000 psi as determined by ASTM D882, and a styrene permeability of below about $2.0 \times 10^{-11}$ g. cm/cm$^2$-hr.

2. The method of claim 1, wherein said multilayered, multipolymer release/barrier film comprises a thermoplastic film including an olefin and polyamide layer that is produced by cast extrusion.

3. The method of claim 2, wherein said olefin is selected from ethylene, propylene, butenes, isoprenes, pentanes, and copolymers thereof.

4. The method of claim 2, wherein said polyamide is selected from polypropiolactam, polypyrrolidone, polycaprolactam, polyhexamethyleneadipamidepolyhexamethylene terephthalamide, polyenanthamide, polypelargonamide, and copolymers thereof.

5. The method of claim 1, wherein said multilayered, multipolymer release/barrier film is manufactured by blown film technology.

6. The method of claim 1, wherein said multilayered, multipolymer release/barrier film is manufactured by Internally Cooled Bubble (IBC) blown film technology.

7. The method of claim 1, wherein said multilayered, multipolymer release/barrier film is manufactured by biaxial orientation film technology.

8. The method of claim 1, wherein said multilayered, multipolymer release/barrier film is manufactured by monoaxial orientation film technology.

9. In a method for producing sheet molding compounds comprising:

(i) casting a layer of heat-curable thermosetting resin, in a fluid form, onto a continuously advancing polymeric film;

(ii) introducing reinforcing material onto the advancing fluid layer;

(iii) casting a layer of heat-curable thermosetting rosin, in a fluid form, onto a second continuously advancing polymeric film;

(iv) contacting said second polymeric film to the top surface of said reinforced fluid layer thereby forming a sandwiched composite;

(v) advancing said sandwiched composite through a series of kneading and compaction rolls; and (vi) winding the sandwiched composite into a roll for partial curing; the improvement which comprises using as the polymeric film a multilayered, multipolymer barrier/release film, said multilayered film having a surface tension of less than 30 dynes/cm, a tensile strength greater than 8000 psi as determined by ASTM D882, and a styrene permeability of below about $2.0 \times 10^{-11}$ g. cm/cm$^2$-hr.

10. The method of claim 9, wherein said multilayered, multipolymer release/barrier film comprises a thermoplastic film including an olefin and polyamide layer that is produced by cast extrusion.

11. The method of claim 10, wherein said olefin is selected from ethylene, propylene, butenes, isoprenes, pentanes, and copolymers thereof.

12. The method of claim 10, wherein said polyamide is selected from polypropiolactam, polypyrrolidone, polycaprolactam, polyhexamethyleneadipamidepolyhexamethylene, terephthalamide, polyenanthamide, polypelargonamide, and copolymers thereof.

13. The method of claim 10, wherein said multilayered thermoplastic film is manufactured by blown film technology.

14. The method of claim 10, wherein said multilayer thermoplastic film is manufactured by Internally Cooled Bubble (IBC) blown film technology.

* * * * *